Patented June 30, 1931

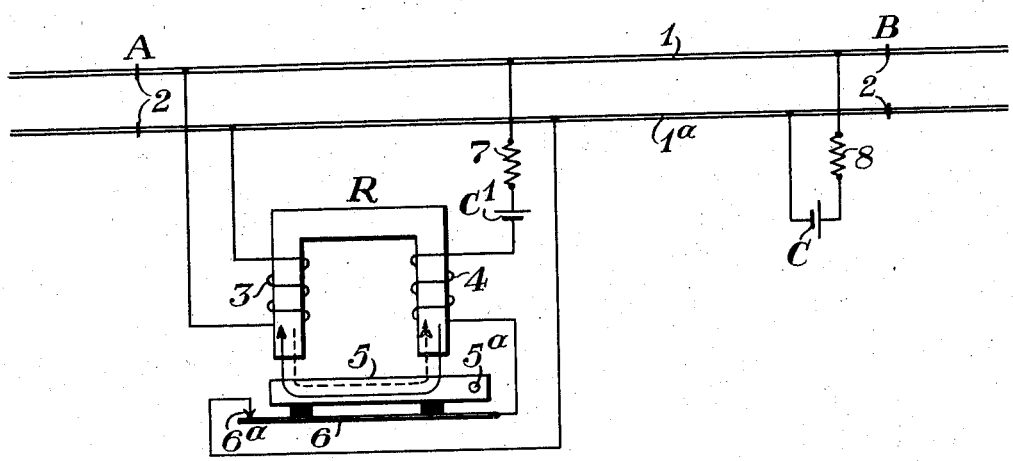

1,812,164

UNITED STATES PATENT OFFICE

BENJAMIN MISHELEVICH, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRACK CIRCUITS

Application filed July 17, 1930. Serial No. 468,500.

My invention relates to railway track circuits, and has for an object the provision of means for reducing the time required for the release of a track relay armature when a train enters the associated section.

I will describe one form of track circuit embodying my invention, and will then point out the novel features thereof in claims.

The accompanying drawing is a diagrammatic view showing one form of track circuit embodying my invention.

Referring to the drawing, the reference characters 1 and 1$^a$ designate the track rails of a railway, which rails are divided by insulated joints 2 to provide a track section A—B.

The reference character R designates a track relay having an armature 5 pivotally mounted at 5$^a$ and biased by gravity to its open position wherein a front contact 6—6$^a$ is open. The relay includes a main winding 3 for closing the armature 5 against the action of gravity, and an auxiliary winding 4 for creating in the armature a flux which opposes the flux created by the main winding 3.

C is the usual source of track circuit current connected across the rails of section A—B through the usual current limiting impedance 8. The main winding 3 of relay R is connected across the rails of section A—B. Auxiliary winding 4 is connected across the rails of section A—B in series with a source of current which as here shown is a battery C$^1$, and in series with contact 6—6$^a$ of relay R. The current flowing through winding 4 opposes the track circuit current.

The parts are so proportioned that when the track section is unoccupied, the flux created by winding 3 is considerably greater than the flux created by winding 4, and that the resultant flux is sufficient to close the armature 5. When the train enters section A—B, however, the wheels and axles will form a low resistance shunt across the rails, so that the main winding 3 will be substantially deenergized, and the flux due to winding 4 will be increased. This will cause a reversal of the flux through the armature, and this reversal will cause the armature to release more quickly than if the auxiliary winding 4 with battery C$^1$ were not provided. The relay will remain open while the track section A—B is occupied because the flux in winding 3 is substantially zero due to the low resistance shunt caused by the wheels and axles of the train, and the flux in winding 4 is zero due to the open circuit at contact 6—6$^a$. Due to the open circuit at contact 6—6$^a$, no power is taken from battery C$^1$ while the track section A—B is occupied.

One feature of my invention is that the quick release of the track relay is accomplished without the necessity for line wires running through the section.

Although I have herein shown and described only one form of track circuit embodying my invention, it is understood that various changes and modifications may be made therein within the scope of the appended claims without departing from the spirit and scope of my invention.

Having thus described my invention, what I claim is:

1. In combination, a section of railway track, a source of current connected across the rails at one end of said section, a relay having two cooperating windings, a connection across the rails at the other end of said section including one of said windings, and a second connection across the rails at the latter end of said section including the other of said windings and a second source of current as well as a front contact of said relay.

2. In combination, a section of railway track, a source of current connected across the rails at one end of said section, a relay having an armature biased by gravity to the open position and a main winding for closing said armature as well as an auxiliary winding for creating in said armature a flux which opposes and is weaker than the flux created therein by said main winding, a connection across the rails at the other end of said section including said main winding, and a second connection across the rails at the latter end of said section including the other of said windings and a second source of current as well as a front contact of said relay.

In testimony whereof I affix my signature.

BENJAMIN MISHELEVICH.